United States Patent
Guan et al.

(10) Patent No.: US 12,535,147 B2
(45) Date of Patent: Jan. 27, 2026

(54) SURGE GUARD VALVE FOR GAS SUPPLY LINE

(71) Applicant: Lincoln Global, Inc., Santa Fe Springs, CA (US)

(72) Inventors: Miguel Guan, Gainesville, GA (US); Randy C. Edenfield, Lula, GA (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 0 days.

(21) Appl. No.: 18/651,737

(22) Filed: May 1, 2024

(65) Prior Publication Data

US 2025/0341261 A1   Nov. 6, 2025

(51) Int. Cl.
  F16K 17/04   (2006.01)
  F16K 17/40   (2006.01)
  F16L 55/10   (2006.01)

(52) U.S. Cl.
  CPC .......... F16K 17/048 (2013.01); *F16K 17/406* (2013.01); *F16K 2200/501* (2021.08); *F16L 55/1007* (2013.01); *Y10T 137/1654* (2015.04)

(58) Field of Classification Search
  CPC .. F16K 47/00; F16K 17/048; F16K 2200/501; F16K 17/082; F16K 17/26; F16K 17/10; F16K 37/005; F16K 17/403; F16K 17/406; Y10T 137/7835; Y10T 137/7992; Y10T 137/7792; Y10T 137/1654; Y10T 137/1789; F16L 55/045; F16L 55/1007; F16F 9/466; F16F 9/512
  USPC ............ 137/501, 504, 509, 67, 68.11, 68.12, 137/68.14–68.17, 71, 538, 540; 91/443; 200/81 R–81 H
  See application file for complete search history.

(56) References Cited

U.S. PATENT DOCUMENTS

| | | | | |
|---|---|---|---|---|
| 2,945,503 A | * | 7/1960 | Atkinson | F16K 17/40 |
| | | | | 137/68.14 |
| 3,719,194 A | * | 3/1973 | Anderson | F16L 55/1015 |
| | | | | 137/68.14 |
| 3,794,057 A | * | 2/1974 | Badger | F16K 17/36 |
| | | | | 137/68.15 |
| 3,916,929 A | * | 11/1975 | Brown | B60K 15/01 |
| | | | | 285/4 |

(Continued)

OTHER PUBLICATIONS

Harris Products Group; "Snap Safe Regulators" Brochure; Available for sale and sold prior to Apr. 30, 2023; p. 1-2.

*Primary Examiner* — Craig J Price
(74) *Attorney, Agent, or Firm* — Brad C. Spencer

(57) ABSTRACT

A gas valve that includes a valve body that extends along an axis of the valve. The body has an internal valve seat. An outer surface of the body includes a break-away reduced diameter region that is located axially downstream of the seat. A valve shutter is movable along the axis within the body between a valve open position and a valve closed position. The valve shutter includes a central fluid channel extending along the axis and having a varying diameter along the axis. A sealing surface is located radially outward of the central fluid channel and engages the seat when the valve shutter is in the valve closed position. A radially-extending duct extends from a fluid inlet on an outer surface of the valve shutter to a fluid outlet to the central fluid channel. The valve shutter includes a further break-away reduced diameter region that is located axially downstream of the sealing surface.

12 Claims, 5 Drawing Sheets

(56) References Cited

U.S. PATENT DOCUMENTS

| | | | |
|---|---|---|---|
| 4,172,468 A | | 10/1979 | Ruus |
| 4,854,338 A | * | 8/1989 | Grantham ................ B67D 7/00 |
| | | | 137/68.14 |
| 4,872,471 A | * | 10/1989 | Schneider ........... F16L 55/1007 |
| | | | 137/68.14 |
| 4,898,199 A | * | 2/1990 | Morris ................ F16L 55/1015 |
| | | | 137/637.05 |
| 4,907,617 A | * | 3/1990 | Whalen ................ F16K 17/406 |
| | | | 137/71 |
| 5,144,973 A | | 9/1992 | Green et al. |
| 5,758,682 A | | 6/1998 | Cain |
| 5,791,366 A | * | 8/1998 | Lo ....................... F16L 55/1007 |
| | | | 137/614.04 |
| 6,802,332 B1 | | 10/2004 | Stuart |
| 9,845,896 B2 | | 12/2017 | Clever |
| 10,054,237 B2 | * | 8/2018 | Roth .................... F16K 17/366 |
| 10,132,418 B2 | | 11/2018 | Diaz |
| 10,514,051 B2 | | 12/2019 | Fiorese et al. |
| 2006/0086832 A1 | | 4/2006 | Roberts |
| 2013/0228069 A1 | | 9/2013 | Cappeller et al. |

* cited by examiner

SURGE GUARD VALVE FOR GAS SUPPLY LINE

BACKGROUND OF THE INVENTION

Field of the Invention

The present invention relates to in-line pressure surge guards for gas supply lines, and in particular to surge guards for oxygen supply systems.

Description of Related Art

Surge guards can be installed in-line between a gas supply tank or cylinder/bottle and a downstream pressure regulator. The downstream pressure regulator supplies gas to a process that utilizes the gas at an appropriate pressure or flow rate. The surge guard prevents the downstream pressure regulator from being hit with a sudden gas pressure shock from the gas cylinder when the pressure regulator is opened. Such a pressure shock can result in an increased temperature in the supply line due to adiabatic compression and possibly a promoted ignition event, especially when the supplied gas is oxygen. An example surge guard is disclosed in U.S. Pat. No. 4,172,468, issued on Oct. 30, 1979, the disclosure of which is incorporated herein by reference. However, known surge guards, if accidentally broken, do not prevent the free release of pressurized gas from the attached cylinder. It would be desirable to provide a surge guard that both prevents pressure shocks from impacting a downstream pressure regulator and also prevents or significantly inhibits the free release of pressurized gas from an attached supply tank if the surge guard becomes broken or damaged.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a gas valve that includes a valve body extending along an axis of the gas valve. The valve body has an internal valve seat. An outer surface of the valve body includes a break-away reduced diameter region that is located axially downstream of the internal valve seat. A valve shutter is movable along the axis within the valve body between a valve open position and a valve closed position. The valve shutter includes a central fluid channel extending along the axis and having a varying diameter along the axis. A sealing surface is located radially outward of the central fluid channel and engages the valve seat when the valve shutter is in the valve closed position. A radially-extending duct extends from a fluid inlet on an outer surface of the valve shutter to a fluid outlet to the central fluid channel. The valve shutter includes a further break-away reduced diameter region that is located axially downstream of the sealing surface.

In accordance with another aspect of the present invention, provided is a gas valve that includes a valve body extending along an axis of the gas valve. The valve body has an internal valve seat. An outer surface of the valve body includes a break-away annular groove that is located axially downstream of the internal valve seat. A valve shutter is movable along the axis within the valve body between a valve open position and a valve closed position. The valve shutter includes a central fluid channel extending along the axis and having a varying diameter along the axis. A sealing surface is located radially outward of the central fluid channel and engages the internal valve seat when the valve shutter is in the valve closed position. A radially-extending duct extends from a fluid inlet on an outer surface of the valve shutter to a fluid outlet to the central fluid channel. The valve shutter includes at least one break-away groove that is located axially downstream of the sealing surface. When the valve shutter is in the valve closed position, the at least one break-away groove is aligned, in a radial direction perpendicular to said axis, with said break-away annular groove of the valve body.

In accordance with another aspect of the present invention, provided is a gas valve that includes a valve body extending along an axis of the gas valve. The valve body has an internal valve seat. An outer surface of the valve body includes a first break-away reduced diameter region that is located axially downstream of the internal valve seat. A valve shutter is movable along the axis within the valve body between a valve open position and a valve closed position. The valve shutter includes a central fluid channel extending along the axis and having a varying diameter along the axis. A sealing surface is located radially outward of the central fluid channel and engages the internal valve seat when the valve shutter is in the valve closed position. A radially-extending duct extends from a fluid inlet on an outer surface of the valve shutter to a fluid outlet to the central fluid channel. The valve shutter includes a second break-away reduced diameter region on the outer surface of the valve shutter that is located axially downstream of the sealing surface. When the valve shutter is in the valve closed position, the second break-away reduced diameter region is aligned with the first break-away reduced diameter region in a radial direction perpendicular to said axis.

In accordance with another aspect of the present invention, provided is a gas valve that includes a valve body extending along an axis of the gas valve. The valve body has an internal valve seat. An outer surface of the valve body includes a break-away annular groove. A valve shutter is movable along the axis within the valve body between a valve open position and a valve closed position. The valve shutter includes a central fluid channel extending along the axis and having a varying diameter along the axis. A sealing surface is located radially outward of the central fluid channel and engages the internal valve seat when the valve shutter is in the valve closed position. A radially-extending duct extends from a fluid inlet on an outer surface of the valve shutter to a fluid outlet to the central fluid channel. The valve shutter includes at least one break-away groove. When the valve shutter is in the valve closed position, the at least one break-away groove is aligned, in a radial direction perpendicular to said axis, with said break-away annular groove of the valve body.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
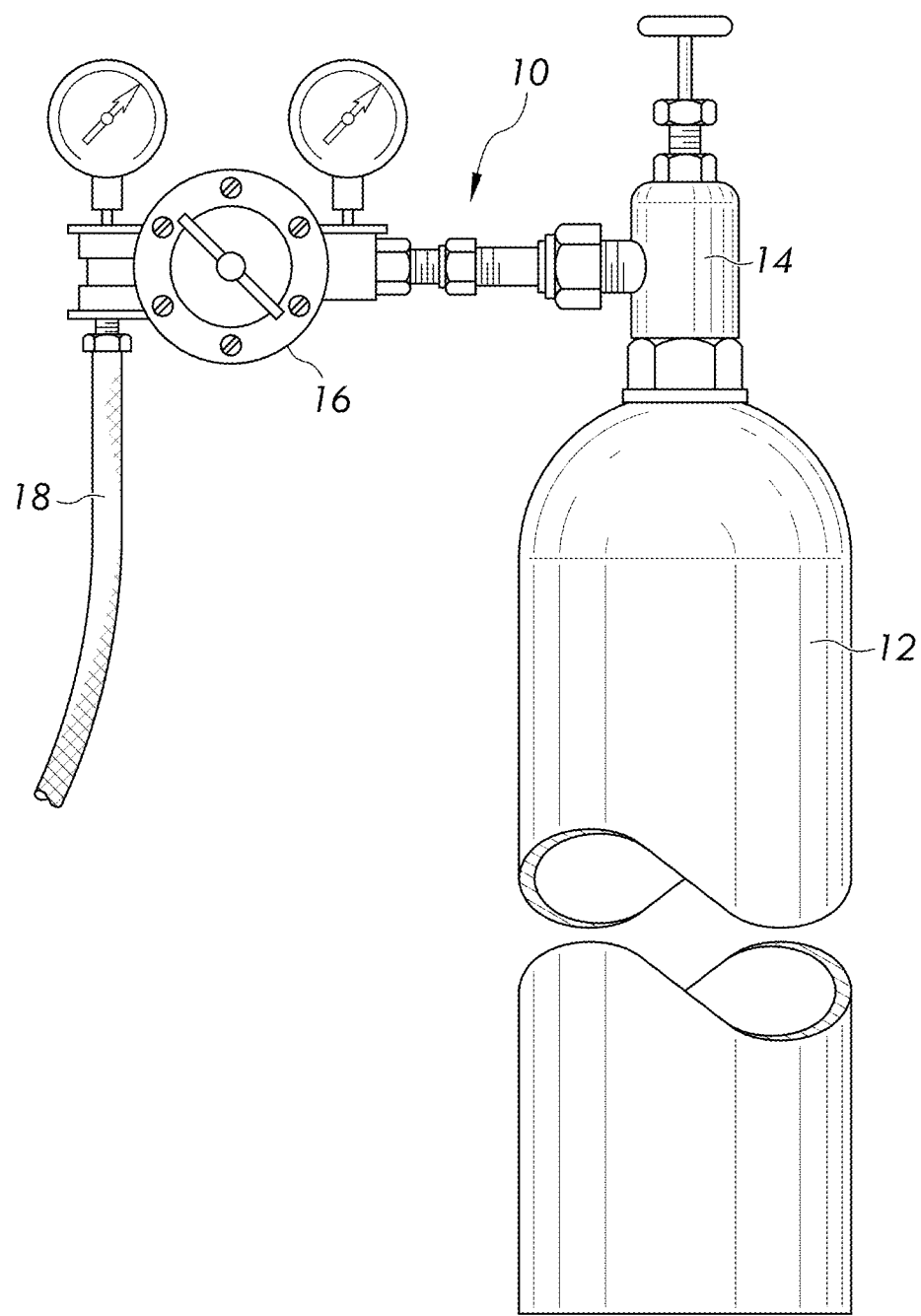
FIG. 1 shows a gas supply system.

The present invention relates to in-line pressure surge guards for gas supply lines. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

FIG. 1 illustrates a high pressure gas tank or cylinder/bottle 12 of the type, for example, used to supply oxygen or the like to a welding or other system and which tank as is well known and includes a manually controlled tank valve 14. As is further well known, a manually controlled regulator or pressure reduction valve 16 is connected between the cylinder 12 and a supply hose 18 leading to a gas torch or other device, not shown. A surge guard gas valve 10 or pressure shock absorbing valve in accordance with the present invention is connected in-line between tank valve 14 and the pressure regulator 16 by suitable fittings.

The surge guard 10 is located in-line between the tank valve 14 and the pressure regulator 16. High pressure tanks or cylinders with pure oxygen are susceptible to starting oxygen fires due to promoted ignition. The surge guard 10 functions to slowly introduce pressure from the cylinder 12 into the regulator 16 when the regulator is opened, to prevent adiabatic compression and reduce the risk of promoted ignition. As will be discussed in more detail below, the surge guard 10 is a gas valve having a movable valve shutter that is biased in a closed position by an internal spring and the upstream pressure of the gas in the cylinder. When the regulator 16 is opened, the surge guard 10 slowly allows pressure to build downstream of the surge guard (e.g., slowly introduces oxygen to the regulator body), and subsequently the valve shutter in the surge guard fully opens due to the increased downstream pressure.

The surge guard 10 also has a "snap safe" feature. Both the body of the surge guard 10 and its shutter have a break-away reduced diameter region or groove (e.g., a V-cut) that provide designed weak points or snap spots that break upon strong impact. When broken along the weak point, the shutter in the surge guard 10 automatically moves to a closed position due to the upstream gas pressure from the cylinder 12. This prevents the uncontrolled release of gas from the cylinder 12.

Figure 2:
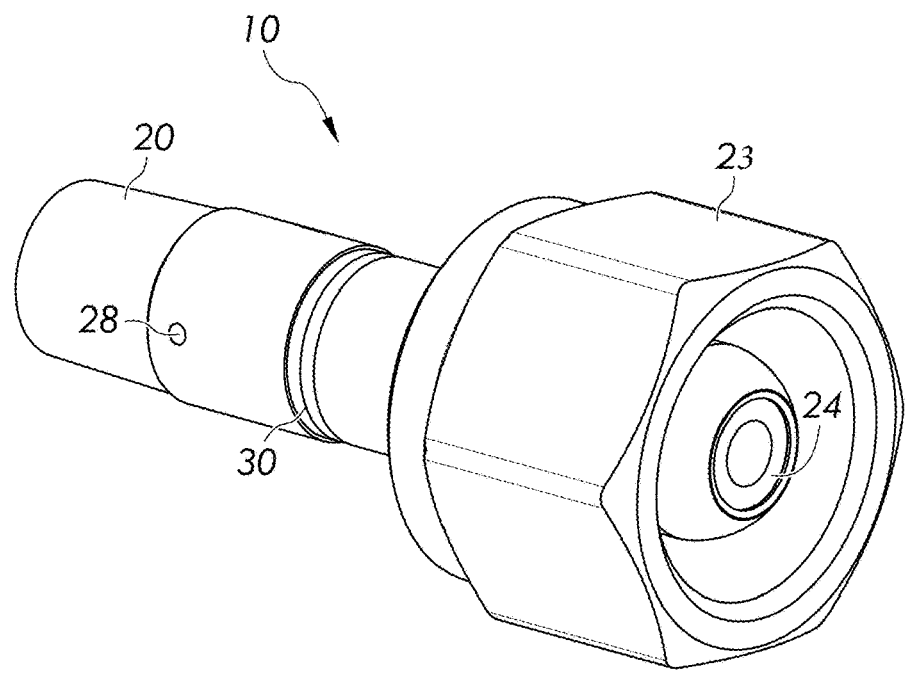
FIG. 2 is a perspective view of a gas valve.
Figure 3:
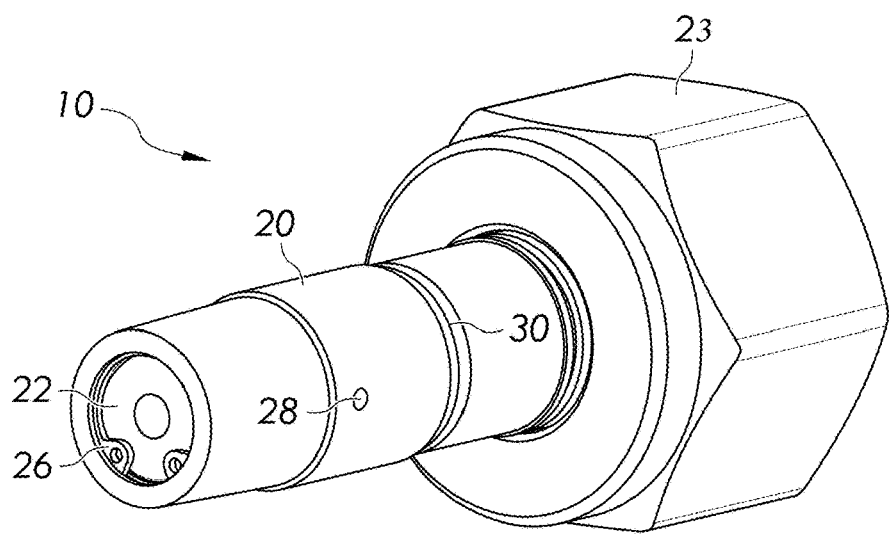
FIG. 3 is a perspective view of the gas valve.

FIGS. 2 and 3 show perspective views of the surge guard 10. FIG. 2 shows the upstream end of the surge guard 10 and FIG. 3 shows the downstream end of the surge guard. The surge guard 10 has a valve body 20 and an internal valve shutter 22 that is movable within the valve body. The upstream end of the surge guard 10 attaches to the cylinder (e.g., to the manually controlled tank valve 14—FIG. 1). For this purpose, the upstream end of the surge guard 10 can include a standard tank coupling nut 23. The downstream end of the valve body 20 can have external threads (not shown) to receive a coupling nipple for connection to the downstream pressure/flow regulator. It will be appreciated that the upstream and downstream ends of valve body 20 are with respect to the direction of fluid flow through the surge guard 10. The upstream end of the surge guard 10 includes a gas filter 24 that filters contaminants entrained in the gas from the cylinder. A C-clip 26 or other appropriate retaining device is located just downstream of the shutter 22 to keep the shutter inside of the valve body 20. The valve body 20 can include a gas vent 28 and break-away reduced diameter region 30. The break-away reduced diameter region 30 provides a weak point at a particular axial location along the valve body 20, to promote breaking at that axial location. The break-away reduced diameter region 30 can be an annual or ring-shaped groove, such as a V-cut, around circumference of the valve body 20 as shown. The break-away reduced diameter region 30 could have a variety of cross-sectional shapes other than a V-shape as long as the region promotes breaking at that axial location under a particular amount of force. In certain embodiments, the break-away reduced diameter region 30 does not form a complete ring around the circumference of the valve body 20. For example, the break-away reduced diameter region 30 could extend part way around the circumference of the valve body 20 or take the form of a perforation having a plurality of reduced diameter sections.

Figure 4:
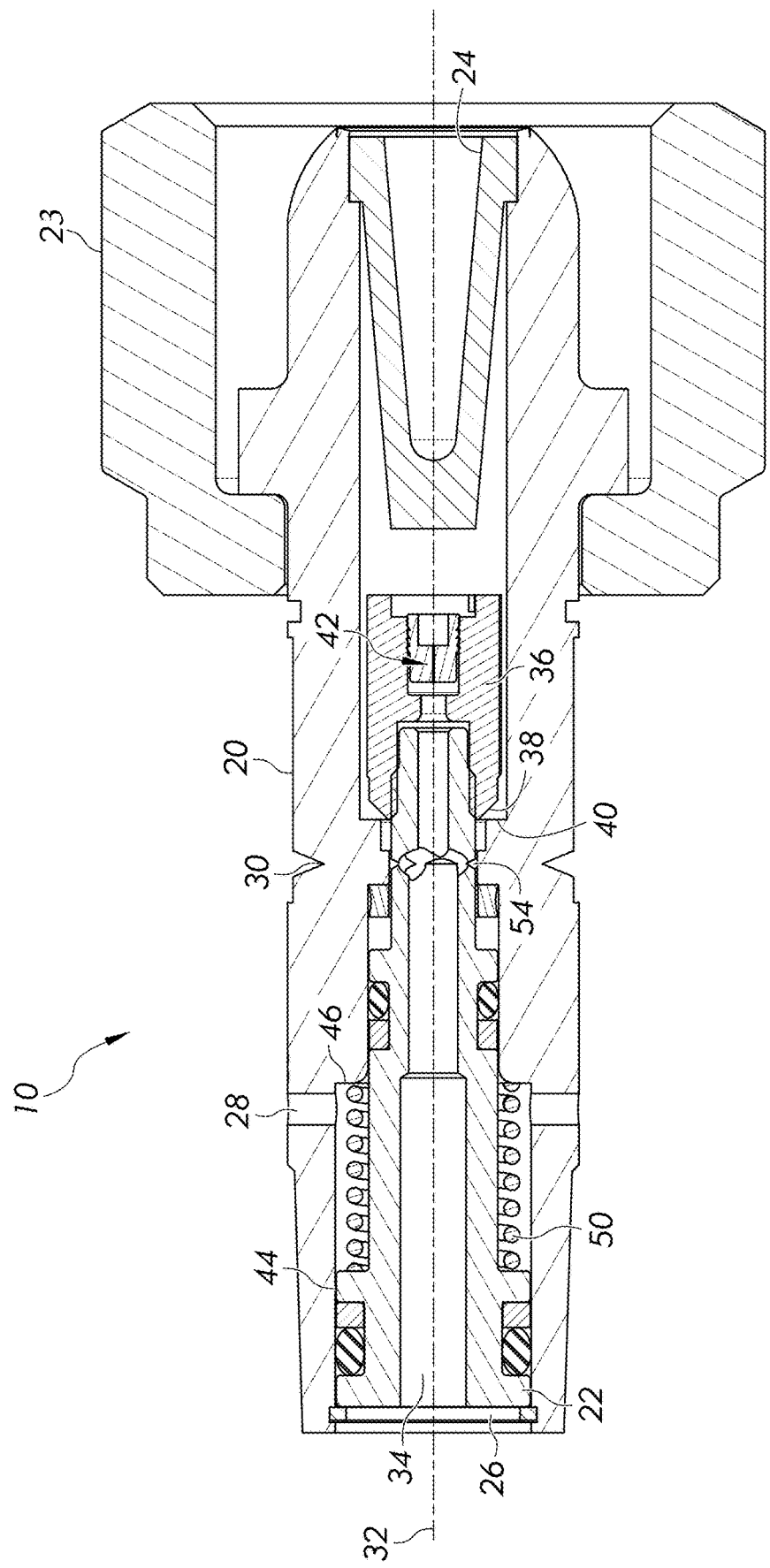
FIG. 4 is a section view of the gas valve.
Figure 5:
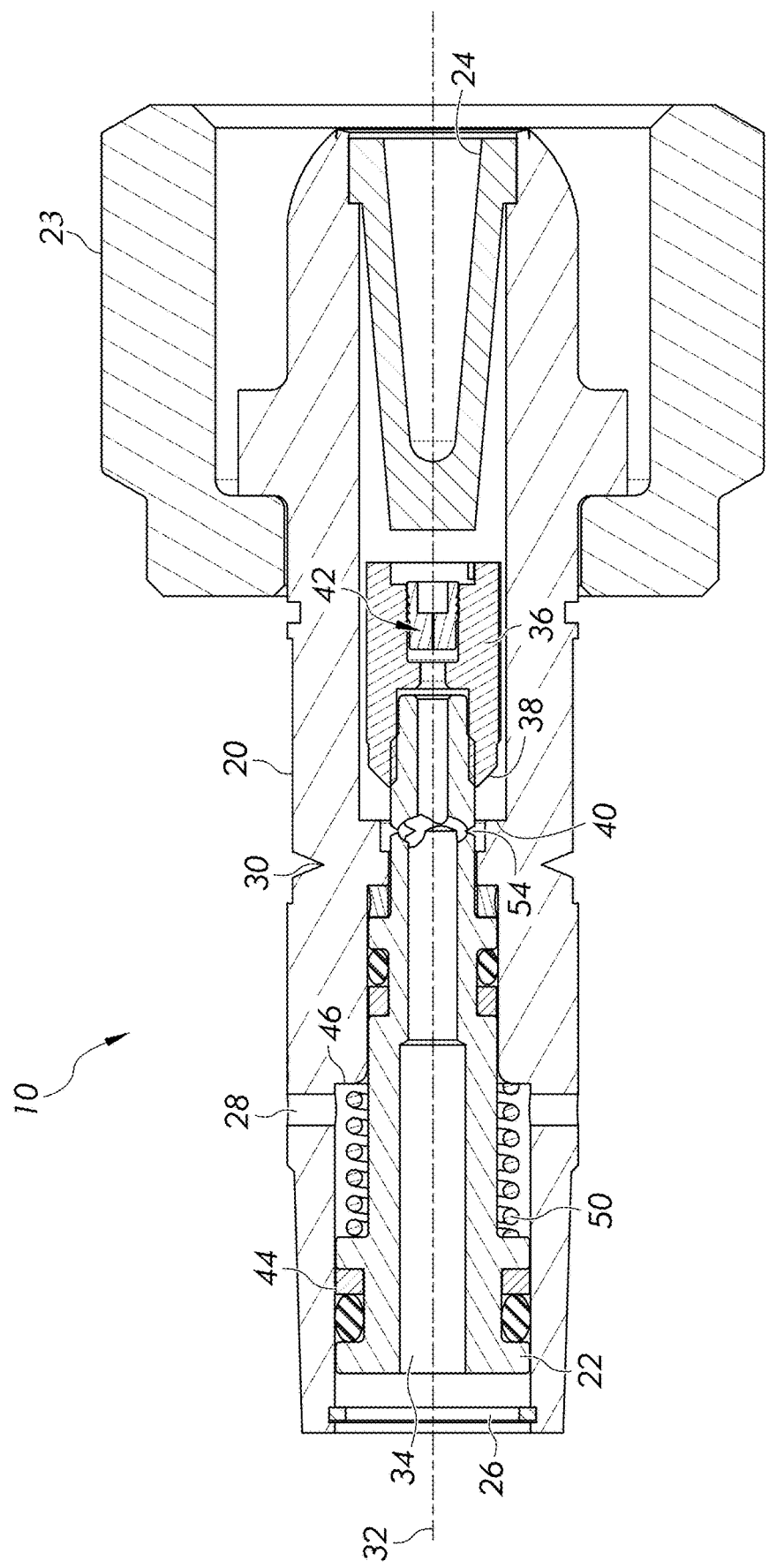
FIG. 5 is a section view of the gas valve.

FIGS. 4 and 5 are cross-sectional views of the surge guard 10. FIG. 4 shows the surge guard 10 in a valve closed position, and FIG. 5 shows the surge guard in a valve open position. The valve body 20 and valve shutter 22 extend along an axis 32, and the valve shutter is movable along the axis within the valve body between the valve open position and the valve closed position.

The valve body 20 has a bore extending along the axis 32. The bore can have a generally circular in cross section and can have a varying diameter along the length of the bore. The valve shutter 22 is linearly movable within the bore in the valve body 20 along the axis 32. The valve shutter 22 has a central fluid channel 34 through which gas is supplied from the gas cylinder to the pressure/flow regulator. The valve shutter 22 can include a head member 36 removably mounted on the upstream end of the valve shutter. Head member 36 can have a form similar to a hexagonal cap nut and is internally threaded for engagement with external threads on the end of the valve shutter. Head member 36 can include a frusto-conical wall 38 extending circumferentially thereabout and facing in the downstream direction with respect to the bore in the valve body 20. The frusto-conical wall 38 provides a sealing surface that is located radially outward of the central fluid channel 34 in the valve shutter. The frusto-conical wall 38 engages and seals against an internal valve seat 40 in the valve body 20 when the valve shutter 22 is in the valve closed position. Head member 36 is provided with a small diameter, restricted passageway 42 which is a flow constriction located along the central fluid channel 34 that impedes the flow of gas from the cylinder through the surge guard 10 (e.g., through the central fluid channel 34) when the valve shutter is in the valve closed position. The small diameter, restricted passageway 42 is in fluid communication with the upstream end of the bore in the valve body 20 and in fluid communication with the downstream end of the central fluid channel 34 in the valve shutter 22. The small diameter, restricted passageway 42 slowly introduces pressure from the cylinder 12 into the regulator 16 (FIG. 1) when the regulator is opened and prevents the rapid release of gas from the cylinder if the surge guard is broken. It can be seen that the central fluid channel 34 in the valve shutter 22 extends along the axis 32 and has a varying diameter along the axis. In particular, the central fluid channel 34 can have a larger diameter at the downstream end than the upstream end, which has the small diameter, restricted passageway 42.

The bore in the valve body 20 can have a shoulder having a circular inner periphery that provides the valve seat 40. Seat 40 is engaged by frusto-conical wall 38 or sealing surface of the head member 36 in the direction of fluid flow through the bore in the valve body 20. The valve shutter 22 is biased in the downstream direction to normally close the bore in the valve body 20. More particularly, the downstream end of the valve shutter 22 is provided with a shoulder 44 and the bore in the valve body 20 is provided with a shoulder 46 axially opposed and spaced apart from shoulder 44. Shoulders 44 and 46 together with the inner surface of the bore in the valve body 20 and the outer surface of the valve shutter 22 define a radial space extending circumferentially about the valve shutter, and a compression or bias spring 50 is received in the radial space with its opposite ends in abutting engagement with shoulders 44 and 46. Thus, spring 50 biases valve shutter 22 in the downstream direction and accordingly biases the sealing surface of the head member 36 into engagement with the internal valve seat 40. Gas pressure from the upstream tank further pushes the frusto-conical wall 38 of the head member 36 against the internal valve seat 40.

Figure 6:
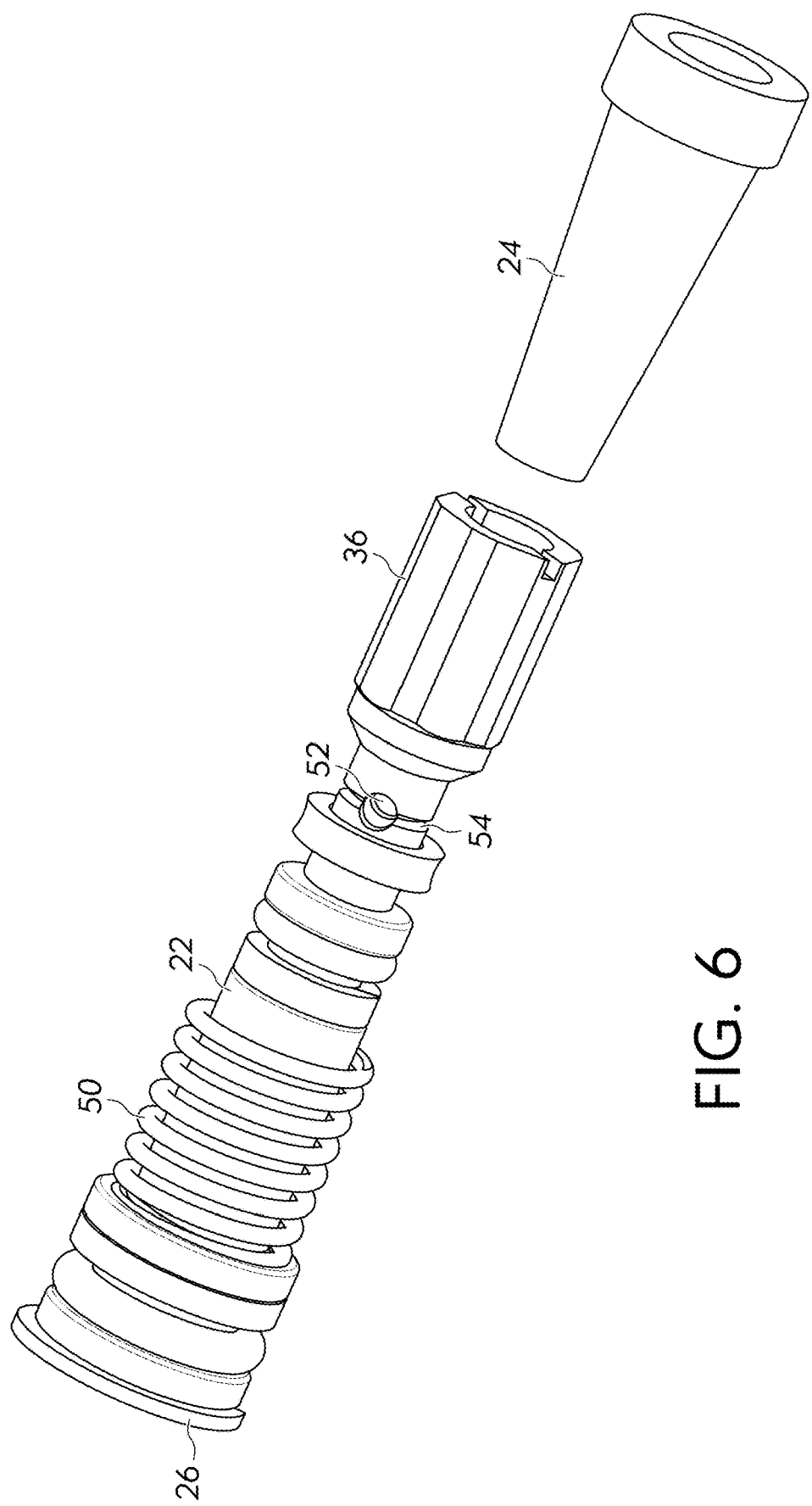
FIG. 6 is a perspective view of a portion of the gas valve.

As best seen in FIG. 6, the valve shutter 22 is provided with diametrically opposed radially-extending ducts 52 or passageways located downstream from the head member 36 and its sealing surface. The radially-extending ducts 52 extend from respective fluid inlets on the outer surface of the valve shutter 22 to respective fluid outlets to the central fluid channel 34. The radially-extending ducts 52 conduct gas from the upstream portion of the bore in the valve body 20 into the central fluid channel 34 in the valve shutter 22 when the valve shutter is in the valve open position. When the valve shutter 22 is in the valve closed position shown in FIG. 4, the radially-extending ducts 52 do not receive a gas flow from the bore in the valve body 20 because the gas flow is blocked by the frusto-conical wall 38 of the head member 36 sealed against the internal valve seat 40 in the bore. When the valve shutter 22 moves in the opening direction (e.g., as downstream gas pressure overcomes the valve-closing biasing force provided by the bias spring 50), the radially-extending ducts 52 move toward the internal valve seat 40 and are thus positioned for fluid flow to readily proceed therethrough and into the central fluid channel 34. In the example embodiment shown in the figures, the radially extending duct 52 can be considered to extend from a first fluid inlet on the outer surface of the valve shutter 22 to a second fluid inlet on the outer surface of the valve shutter spaced 180 degrees apart from the first fluid inlet. The radially-extending duct(s) 52 can be a through bore that is oriented perpendicular to the central fluid channel 34. The valve shutter can include a number of radially-extending ducts 52 as desired (e.g., one, two, three, four, etc.) sufficient to conduct an appropriate gas flow from the bore in the valve body 20 to the central fluid channel 34 and on to a downstream regulator.

The valve shutter 22 can include seals, such as O-rings, to prevent gas leakage around the valve shutter. In order to prevent any gas pressure build-up in spaces between the seals (e.g., in the event of gas leakage past the seals), the valve body 20 can include one or more gas vents 28 through the valve body that are vented to atmosphere.

From the foregoing description, it will be appreciated that the direction of gas flow through the valve is to the left as seen in FIGS. 4 and 5. It will be further appreciated that bias spring 50 biases valve shutter 22 in the direction of fluid flow to normally hold the sealing surface of the head member 36 against the internal valve seat 40 to close the bore in the valve body 20 against gas flow around the head member and past the internal valve seat 40. Upon opening the gas supply valve from the gas cylinder, the sudden surge of gas pressure into the upstream end of the bore in the valve body 20 impinges upon the head member 36 and advantageously increases the seating force of the frusto-conical wall 38 against the valve seat 40 to assure against any gas flow along the head member and across the seat. The restricted passageway 42 in the head member 36 bleeds the gas from the gas cylinder through the head member to the central fluid channel 34 in the valve shutter 22, and thence to the downstream pressure/flow regulator so as to gradually build-up pressure in the regulator and thus avoid sudden pressurization thereof. When the pressure in the downstream regulator reaches a magnitude where the shock will no longer be significant, which magnitude is generally about 40 to 45 percent of the supply pressure, the force on the downstream working area of the valve shutter 22 will overcome the closing force provided by bias spring 50 and the supply gas pressure acting against head member 36. When the closing force is overcome in this manner, the valve shutter 22 is displaced to the right, as shown in FIG. 5, unseating the frusto-conical wall 38 from the internal valve seat 40 and thus allowing full flow of supply gas past the head member 36 of the valve shutter and into its radially-extending ducts 52. The valve shutter 22 will remain in the valve open position as long as the system is pressurized downstream thereof and the downstream pressure contributes a back force on the valve shutter that overcomes the bias force of the bias spring 50. Upon a drop in downstream pressure to a magnitude resulting in a back force less than the force of the bias spring 50, the spring will close the surge valve 10 in preparation for a new cycle of operation.

As noted above, the surge guard 10 has a "snap safe" feature. Both of the valve body 20 and the valve shutter 22 have a break-away reduced diameter region or groove (e.g., a V-cut) that provide designed weak points or snap spots that break upon strong impact. When broken along the weak point, the valve shutter 22 automatically moves to the valve closed position due to the upstream gas pressure from the gas cylinder. The weak point along the valve body 20 is provided by the break-away reduced diameter region 30. A corresponding weak point along the valve shutter 22 is provided by another break-away reduced diameter region 54. In an example embodiment, the break-away reduced diameter region 54 can be a V-cut groove along the outer surface of the shutter that extends between the radially-extending ducts 52. Thus, the break-away reduced diameter region 54 can be located at the same axial location along the valve shutter 22 as the radially-extending ducts 52. The break-away reduced diameter region 54 can extend circumferentially around the outer surface of the valve shutter 22 from one fluid inlet on the outer surface of the valve shutter to the second fluid inlet on the outer surface of the valve shutter. The break-away reduced diameter region 30 or break-away annular groove on the valve body 20 is located axially downstream of the internal valve seat 40. The break-away reduced diameter region 54 or break-away groove on the valve shutter 22 is located axially downstream of the valve sealing surface provided by the frusto-conical wall 38 of the head member 36. If the valve body 20 and the valve shutter 22 should break along the weak points 30, 54, the internal valve seat 40 and the valve sealing surface provided by the frusto-conical wall 38 will remain attached to the upstream gas cylinder and will close under pressure from the cylinder, to prevent a rapid, uncontrolled release of gas. Gas will still be released slowly through the restricted passageway 42 in the head member 36. As can be seen in FIG. 4, when the valve shutter 22 is in the valve closed position, the break-away reduced diameter region 54 on the shutter is aligned in a radial direction perpendicular to axis 32 with the break-away reduced diameter region 30 of the valve body 20. In an example embodiment, the introduced weak points 30, 54 on the surge guard 10 are designed to break upon application of a specific force or torque (e.g., 50 ft-lbs.) Such a force could be the result of the gas cylinder falling over for example, or due to an object falling or otherwise hitting the supply line between the cylinder and the downstream regulator.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A gas valve comprising:
 a valve body extending along an axis of the gas valve, wherein the valve body has an internal valve seat, and wherein an outer surface of the valve body includes a break-away reduced diameter region that is located axially downstream of the internal valve seat;
 a valve shutter movable along the axis within the valve body between a valve open position and a valve closed position, wherein the valve shutter includes:
  a central fluid channel extending along the axis and having a varying diameter along the axis,
  a sealing surface located radially outward of the central fluid channel that engages the internal valve seat when the valve shutter is in the valve closed position,
  a first radially-extending duct extending from a first fluid inlet on an outer surface of the valve shutter to a first fluid outlet to the central fluid channel, and
  a second radially-extending duct extending from a second fluid inlet on the outer surface of the valve shutter to a second fluid outlet to the central fluid channel;
 wherein the valve shutter includes a further break-away reduced diameter region that is located axially downstream of the sealing surface, and the further break-away reduced diameter region comprises a groove in the outer surface of the valve shutter that extends circumferentially around the outer surface of the valve shutter from the first fluid inlet on the outer surface of the valve shutter to the second fluid inlet on the outer surface of the valve shutter.

2. The gas valve of claim 1, further comprising a flow constriction located along the central fluid channel.

3. A gas valve comprising:
 a valve body extending along an axis of the gas valve, wherein the valve body has an internal valve seat, and wherein an outer surface of the valve body includes a break-away annular groove that is located axially downstream of the internal valve seat;
 a valve shutter movable along the axis within the valve body between a valve open position and a valve closed position, wherein the valve shutter includes:
  a central fluid channel extending along the axis and having a varying diameter along the axis,
  a sealing surface located radially outward of the central fluid channel that engages the internal valve seat when the valve shutter is in the valve closed position, and
  a radially-extending duct extending from a fluid inlet on an outer surface of the valve shutter to a fluid outlet to the central fluid channel,
 wherein the valve shutter includes at least one break-away groove that is located axially downstream of the sealing surface, and wherein, when the valve shutter is in the valve closed position, the at least one break-away groove is aligned, in a radial direction perpendicular to said axis, with said break-away annular groove of the valve body.

4. The gas valve of claim 3, wherein the radially-extending duct extends from the fluid inlet on the outer surface of the valve shutter to another fluid inlet on the outer surface of the valve shutter.

5. The gas valve of claim 4, wherein the at least one break-away groove extends circumferentially around the outer surface of the valve shutter from the fluid inlet on the outer surface of the valve shutter to the another fluid inlet on the outer surface of the valve shutter.

6. The gas valve of claim 3, further comprising a flow constriction located along the central fluid channel.

7. A gas valve comprising:
 a valve body extending along an axis of the gas valve, wherein the valve body has an internal valve seat, and wherein an outer surface of the valve body includes a first break-away reduced diameter region that is located axially downstream of the internal valve seat;
 a valve shutter movable along the axis within the valve body between a valve open position and a valve closed position, wherein the valve shutter includes:
  a central fluid channel extending along the axis and having a varying diameter along the axis,
  a sealing surface located radially outward of the central fluid channel that engages the internal valve seat when the valve shutter is in the valve closed position,
  a first radially-extending duct extending from a first fluid inlet on an outer surface of the valve shutter to a first fluid outlet to the central fluid channel, and a second radially-extending duct extending from a second fluid inlet on the outer surface of the valve shutter to a second fluid outlet to the central fluid channel;

wherein the valve shutter includes a second break-away reduced diameter region on the outer surface of the valve shutter that is located axially downstream of the sealing surface, and wherein, when the valve shutter is in the valve closed position, the second break-away reduced diameter region is aligned with the first break-away reduced diameter region in a radial direction perpendicular to said axis, and wherein the second break-away reduced diameter region comprises a groove in the outer surface of the valve shutter that extends circumferentially around the outer surface of the valve shutter from the first fluid inlet on the outer surface of the valve shutter to the second fluid inlet on the outer surface of the valve shutter.

8. The gas valve of claim 7, further comprising a flow constriction located along the central fluid channel.

9. A gas valve comprising:

a valve body extending along an axis of the gas valve, wherein the valve body has an internal valve seat, and wherein an outer surface of the valve body includes a break-away annular groove;

a valve shutter movable along the axis within the valve body between a valve open position and a valve closed position, wherein the valve shutter includes:

a central fluid channel extending along the axis and having a varying diameter along the axis, a sealing surface located radially outward of the central fluid channel that engages the internal valve seat when the valve shutter is in the valve closed position, and a radially-extending duct extending from a fluid inlet on an outer surface of the valve shutter to a fluid outlet to the central fluid channel, wherein the valve shutter includes at least one break-away groove, and wherein, when the valve shutter is in the valve closed position, the at least one break-away groove is aligned, in a radial direction perpendicular to said axis, with said break-away annular groove of the valve body.

10. The gas valve of claim 9, wherein the radially-extending duct extends from the fluid inlet on the outer surface of the valve shutter to another fluid inlet on the outer surface of the valve shutter.

11. The gas valve of claim 10, wherein the at least one break-away groove extends circumferentially around the outer surface of the valve shutter from the fluid inlet on the outer surface of the valve shutter to the another fluid inlet on the outer surface of the valve shutter.

12. The gas valve of claim 9, further comprising a flow constriction located along the central fluid channel.

\* \* \* \* \*